US005485318A

United States Patent [19]
Lebby et al.

[11] Patent Number: 5,485,318
[45] Date of Patent: Jan. 16, 1996

[54] DUAL IMAGE MANIFESTATION APPARATUS WITH INTEGRATED ELECTRO-OPTICAL PACKAGE

[75] Inventors: Michael S. Lebby, Apache Junction; Karen E. Jachimowicz, Laveen, both of Ariz.

[73] Assignee: Motorola, Inc., Schaumburg, Ill.

[21] Appl. No.: 316,955

[22] Filed: Oct. 3, 1994

[51] Int. Cl.[6] .................................................... G02B 7/02
[52] U.S. Cl. .............................. 359/811; 362/247; 385/14
[58] Field of Search ........................... 359/798–801, 359/809, 810, 811, 316–319; 362/27, 30, 227, 228, 235, 236, 244, 247; 385/2, 8, 14

[56] References Cited

U.S. PATENT DOCUMENTS

| | | | |
|---|---|---|---|
| 3,064,523 | 11/1962 | Meltzer | 359/799 |
| 3,767,291 | 10/1973 | Johnson | 359/800 |
| 5,404,009 | 4/1995 | Kando et al. | 385/14 |
| 5,412,509 | 5/1995 | Nakata et al. | 359/811 |

*Primary Examiner*—Loha Ben
*Attorney, Agent, or Firm*—Eugene A. Parsons

[57] ABSTRACT

Dual image manifestation apparatus including real image generation means mounted on a mounting structure for providing at least one real image, a low magnification optical system supported on the mounting structure to receive the image at an optical input and provide a magnified image directly viewable at an optical output, and a high magnification optical system supported on the mounting structure to receive the image at an optical input and provide an enlarged virtual image at an optical output. Electrical connections for the image generation means are provided through the mounting structure. The apparatus is designed for operation with pagers, cellular telephones, etc.

34 Claims, 8 Drawing Sheets

DUAL IMAGE MANIFESTATION APPARATUS WITH INTEGRATED ELECTRO-OPTICAL PACKAGE

FIELD OF THE INVENTION

The present invention pertains to image manifestation apparatus and more particularly to dual image manifestation apparatus formed in an integrated optical package.

BACKGROUND OF THE INVENTION

Through the use of digital signals which are being transmitted at ever increasing frequencies, it is possible to transmit increasingly larger and more complex messages to remote portable units. Portable communications transceivers and other portable electronic equipment, such as cellular and cordless telephones, pagers, data banks, and the like, are becoming increasingly popular. In some instances it is possible to send complete messages, including alpha-numerics and/or graphics by way of novel pagers. Thus, complete messages can be sent to specific recipients by way of a pager, for example.

Also, in many instances it is desirable to provide a visual display on the communication transceiver to supply the operator with an indication of messages received, numbers actually dialed, and other minor but critical information. The problem is that the visual displays on prior art communications receivers are extremely limited in size and require relatively high electrical power as well as a great amount of area to be sufficiently large to produce a useful display. Thus, while the present visual displays are generally sufficient for displaying the minor information, they are not capable of displaying large alpha-numeric and/or graphic messages.

In the prior art, for example, it is common to provide visual displays utilizing liquid crystal displays, directly viewed light emitting diodes, etc. These produce very large and cumbersome displays that greatly increase the size of the transceiver and require relatively large amounts of power. Further, such displays, when used on pagers, greatly limit the amount and, in many instances, the type of messages that can be received.

Some types of devices have been proposed which are capable of displaying larger messages while utilizing a smaller amount of space in the portable electronic device. In one instance, the prior art includes a scanning mirror to produce a visual display but again this requires relatively large amounts of power and is very complicated and sensitive to shock. Also, the scanning mirror causes vibration in the unit that substantially reduces visual comfort and acceptability.

Some attempts have been made to produce displays using arrays of light emitting devices on a single semiconductor chip. Generally, a semiconductor chip, or integrated circuit, is mounted on a printed circuit board or the like and the accepted method for connecting the chip to external circuits is to use standard wire bond technology. However, when a semiconductor chip having a relatively large array of electrical components or devices formed thereon is to be connected, standard wire bond techniques can become very difficult. For example, if a relatively large array (greater than, for example, 10,000 or 100×100) of light emitting devices is formed on a semiconductor chip with a pitch (center-to-center separation) of P, then bond pads on the perimeter of the semiconductor chip will have a 2P pitch. This is true because every other row and every other column goes to an opposite edge of the perimeter to increase the distance between bond pads as much as possible.

At the present time wire bond interconnects from bond pads having a pitch of 4.8 milli-inches is the best that is feasible. Thus, in the array mentioned above of 100×100 light emitting diodes the bond pads on the perimeter of the semiconductor chip would have a minimum pitch of 4.8 milli-inches, with 50 bond pads situated along each edge of the perimeter. As more devices are included in the array, more bond pads are required and the perimeter size to accommodate the additional bond pads increases at an even greater rate. That is, since the minimum pitch of the bond pads is 4.8 milli-inches, the pitch of the devices in the array can be as large as 2.4 milli-inches, or approximately 61 microns, without effecting the size of the chip. Thus, even if the devices can be fabricated smaller than 61 microns, the minimum pitch of the bonding pads will not allow the perimeter of the chip to be made any smaller. It can quickly be seen that the size of the semiconductor chip is severely limited by the limitations of the wire bonding technology.

Further, it has been common practice to mount semiconductor chips and interface circuitry on a single board. The problem that arises is the large amount of surface area required to mount and connect various components.

Thus, there is a need for improved image manifestation apparatus and interconnect and packaging structures and techniques which can substantially reduce limitations on the size of the image manifestation apparatus and the semiconductor chips used therein,.

Accordingly, it is a purpose of the present invention to provide new and improved dual image manifestation apparatus with an integrated electro-optic package.

It is another purpose of the present invention to provide a new and improved dual image manifestation apparatus with an integrated electro-optic package including a direct view display and a large virtual display.

It is a further purpose of the present invention to provide a new and improved dual image manifestation apparatus with an integrated electro-optic package including a direct view display and a large virtual display which is compactly packaged.

It is yet another purpose of the present invention to provide a new and improved dual image manifestation apparatus with an integrated electro-optic package including a direct view display and a large virtual display which is relatively easy and inexpensive to fabricate.

It is still another purpose of the present invention to provide new and improved dual image manifestation apparatus including a direct view display and a large virtual display which is fabricated in a single integrated electro-optic package which can be easily incorporated into portable electronic equipment.

It is another purpose of the present invention to provide new and improved communication transceivers with dual image manifestation apparatus including a direct view display and a large virtual display.

SUMMARY OF THE INVENTION

The above problems and others are at least partially solved and the above purposes and others are realized in dual image manifestation apparatus with an integrated electro-optical package including real image generation means mounted on a mounting structure for providing at least one real image, a low magnification optical system supported on the mounting structure to receive the one real image at an optical input and provide a magnified real image directly viewable at an optical output, and a high magnification optical system supported on the mounting structure to receive the one real image at an optical input and provide an enlarged virtual image at an optical output.

Electrical connections for the image generation means are provided through the mounting structure and in some embodiments the mounting structure includes an optically clear portion forming an optical waveguide for guiding the image from an image generator to the magnifying optical systems.

BRIEF DESCRIPTION OF THE DRAWINGS

Referring to the drawings.

DESCRIPTION OF THE PREFERRED EMBODIMENTS

Figure 1:
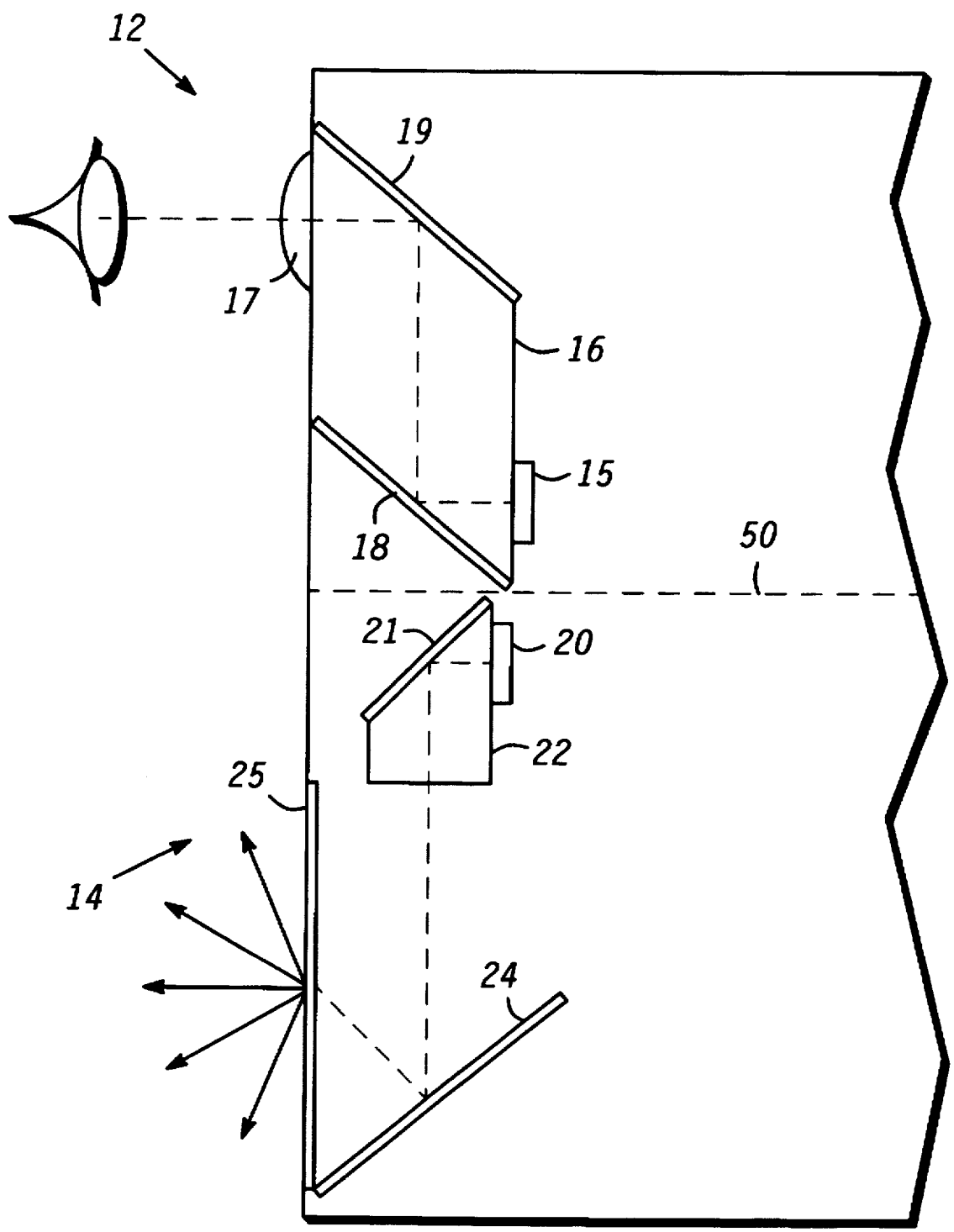
FIG. 1 is a simplified schematic view generally illustrating dual image manifestation apparatus in accordance with the present invention.

Referring specifically to FIG. 1, a simplified schematic view generally illustrating dual image manifestation apparatus 10 in accordance with the present invention is illustrated. Dual image manifestation apparatus 10 includes first image manifestation apparatus 12 constructed to provide a large virtual image and second image manifestation apparatus 14 constructed to provide a direct view image. Apparatus 12 includes a real image generator 15 affixed in overlying relationship to an optical input of an optical waveguide 16. An optical output of optical waveguide 16 is positioned to be externally available and has a lens system, represented by a single lens 17, affixed thereover.

Image generator 15 includes, for example, semiconductor electronics such as a two-dimensional light emitting device (LED) array driven by data processing circuits. The array of LEDs can include any of the well known light emitting devices, such as but not limited to light emitting diodes Organic or inorganic), electroluminescent devices, vacuum field emission devices, vertical cavity surface emitting lasers, etc. The data processing circuits include, for example, logic and switching circuit arrays for controlling each LED in the LED array. The data processing circuits include, in addition to or instead of the logic and switching arrays, a microprocessor or similar circuitry for processing input signals to produce a desired real image on a device such as the LED array. It will be understood that the data processing circuits and the LED array could be formed on the same semiconductor chip in some applications.

In this specific embodiment the LED array is utilized because of the extremely small size that can be achieved and because of the simplicity of construction and operation. The LEDs are formed in a regular, addressable pattern of rows and columns on a single substrate or semiconductor chip and, it should be understood that many of the other circuits utilized in the operation could be included on the same substrate or chip. By addressing specific LEDs by row and column in a well known manner, the specific LEDs are energized to produce a real image. Digital or analog data is received at an input terminal and converted by data processing circuits into signals capable of energizing selected LEDs to generate the predetermined real image.

It will be understood by those skilled in the art that image generator 15 is actually much smaller than illustrated in FIG. 1. General, a substrate, e.g. a semiconductor chip, carrying the LED array ranges from approximately 2 centimeters on each side to 1 millimeter on each side and, in a preferred embodiment of the present invention, the size of the array ranges from 1.0 centimeter on a side to 0.1 centimeter on a side. Further, each light emitting device or pixel ranges in size approximately from 50.0 microns to 0.25 micron on a side having a preferred range from 20.0 microns to 0.5 micron. It should be understood that the actual light emitting device array is much smaller, because bonding pads, etc. add several millimeters of area on each side. Generally, the larger size substrates simply mean that more light emitting devices are used in the array to provide more definition, color, etc.

As the semiconductor and organic technology reduces the size of the substrate, greater magnification and smaller lens systems are required. Reducing the size of the lenses while increasing the magnification results in greatly limiting the field of view, substantially reducing eye relief and reducing the working distance of the lens system. Generally, optical waveguide 16 includes one or more optical elements 18 and 19, which may be Fresnel lenses, reflective elements, refractive elements, diffractive elements, etc. Elements 18 and 19 provide some magnification and may reduce various types of distortion. Lens system 17 is mounted so as to receive the image from optical waveguide 16, magnify it an additional predetermined amount and create the aperture within which a virtual image is viewed. In the present embodiment, optical waveguide 16 and lens system 17 magnify the image a total of approximately twenty times. Generally, a magnification greater than ten (10x) is required to magnify the real image generated by image generator 15 sufficiently to be perceived by a human eye.

It will of course be understood that lens system 17 may be adjustable for focus and additional magnification, if desired, or may be fixed in a housing for simplicity. Because the image received by lens system 17 from optical waveguide 16 is much larger than the image at image generator 15, lens system 17 is not required to provide the entire magnification and, therefore, is constructed larger and with less magnification. Because of this larger size, the lens system has a larger field of view and a greater working distance, which in turn provides better eye relief.

Here it should be understood that the virtual image viewed by the operator through lens system 17 is relatively large (e.g. 8.5"×11") and appears to the operator to be several feet behind dual image manifestation apparatus 10. Because of the size of the virtual image produced by image manifestation apparatus 12, a large variety of alpha-numeric and/or graphic images can be easily and conveniently viewed. Further, image manifestation apparatus 12 is very small and compact so that it can easily be incorporated into portable electronic devices, such as pagers, two-way radios, cellular telephones, data banks, etc., without substantially effecting the size or power requirements.

Second image manifestation apparatus 14 constructed to provide a direct view image includes an image generator 20, which is similar to image generator 15 and will not be explained further, an optical waveguide 22 an optical element 24 and a direct view screen 25. Image generator 20 is mounted in overlying relationship on an optical input to optical waveguide 22. The image from image generator 20 is reflected and/or otherwise directed by an optical element 21 onto optical element 24. While element 24 is illustrated as a separate element, it will be understood that it could be incorporated as a portion of optical waveguide 22. Optical element 24 can also include a Fresnel lens, or the like, for focusing and/or magnification if desired. The image from optical element 24 is directed onto screen 25 where it can be directly viewed by the operator.

Image manifestation apparatus 14 provides a direct view image which can be no larger than screen 25 upon which it is projected. Because of the much smaller size of the direct view image, the amount of magnification required is much smaller, i.e. less than approximately 10×. Generally, while the direct view image is much smaller than the virtual image produced by image manifestation apparatus 12, more power is required to generate the direct view image because more light is required to project the image onto screen 25. However, because the direct view image is smaller, any message contained in the direct view image must be larger in order to be perceived by the operator. Thus, whereas one LED in the array of image generator 15 produces one pixel in the final virtual image (for example), several LEDs in the array of image generator 20 operate in conjunction to produce one pixel in the direct view image on screen 25. Because several LEDs produce one pixel, in many instances the higher power requirement may be automatically resolved. If additional power is required in some applications, drive current to the LED array can be increased, as one example.

Figure 2:
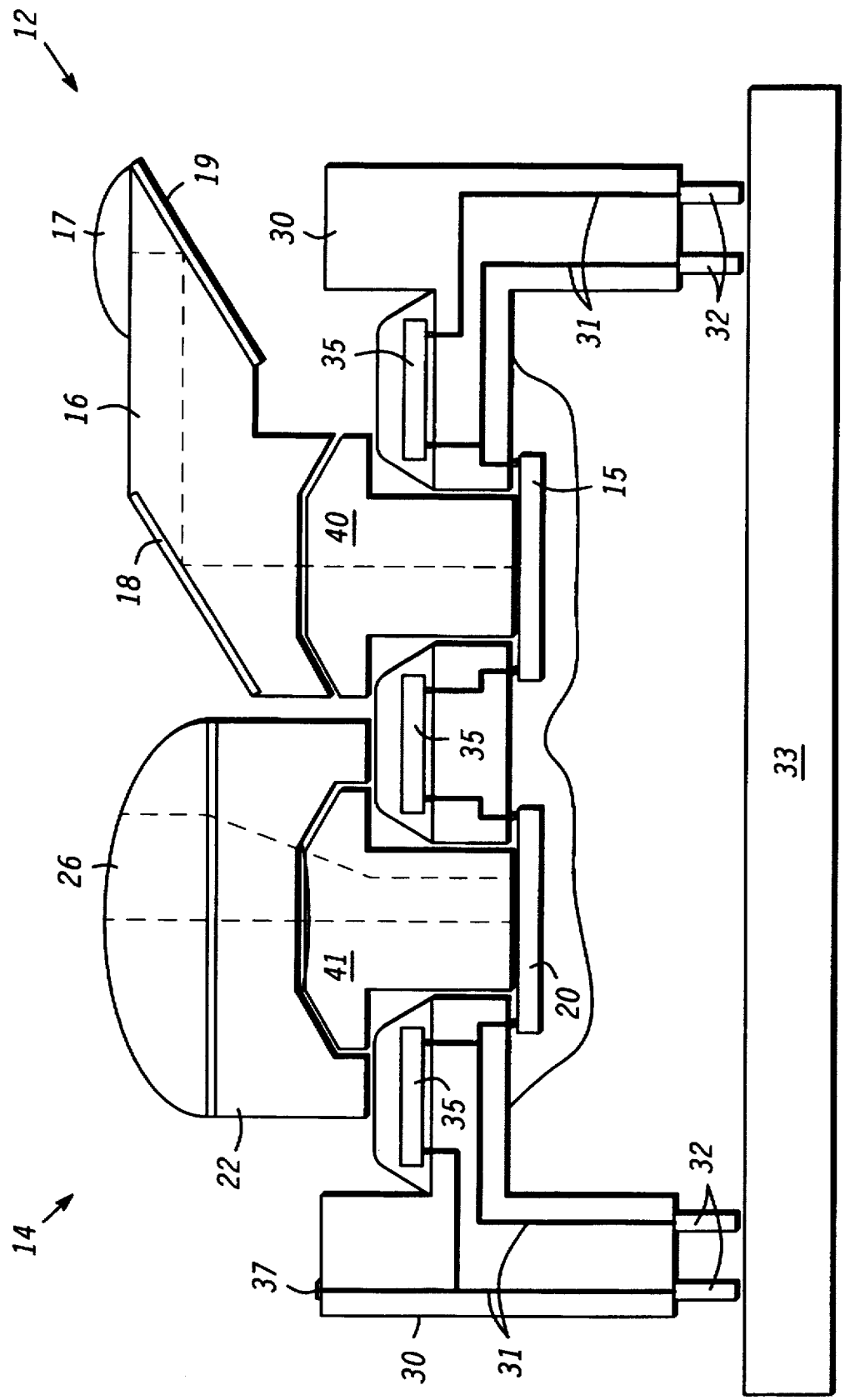
FIG. 2 is a sectional view of the dual image manifestation apparatus with an integrated electro-optical package of FIG. 1.

Referring specifically to FIG. 2, a sectional view of dual image manifestation apparatus 10 with an integrated electro-optical package is illustrated. Components in FIG. 2 which are similar to components discussed in conjunction with FIG. 1 are designated with similar numbers. In this embodiment, a mounting structure 30 is provided with leads 31 extending therethrough. Generally, mounting structure 30 is molded of plastic or the like and leads 31 are flexible leadframes imbedded therein during the molding operation. In a somewhat different embodiment, the outer vertical portion of mounting structure 30 is a molded ring and the inner horizontal portion is an FR4 printed circuit board which is integrated (physically and electrically) with the molded ring during the molding process. Mounting structure 30 has connection and mounting pins 32, which may be for example, standard electronic mounting pins, affixed in the lower surface of the outer ring for mounting dual image manifestation apparatus on a printed circuit board 33 of a portable electronic device.

Image generators 15 and 20 are connected by some convenient means, such as bump bonding, to a lower surface of mounting structure 30 in overlying relationship to a pair of openings extending through mounting structure 30. Image generators 15 and 20 are oriented so that images generated thereby are directed upwardly through the openings toward the top side of mounting structure 30. A plurality of driver circuits 35 are mounted on the upper surface of mounting structure 30, in this embodiment by bump bonding, and are connected to image generators 15 and 20 and to connecting pins 32 through leads 31. Inputs 37 (data, power, etc.) are also provided at various points on the upper surface of mounting structure 30 and connect to the remainder of the circuitry through leads 31. Image generators 15 and 20 and driver circuits 35 are encapsulated in any well known manner for protection.

Generally, mushroom shaped optical waveguide portions 40 and 41 are molded from optically clear material and formed so as to snap readily into the openings in mounting structure 30. Optical waveguide 16 is then positioned on portion 40, either by snap fitting or adhering with glue, etc., so as to be in optical communication with portion 40 and receive generated images from image generator 15. Similarly, optical waveguide 22 is positioned on portion 41, either by snap fitting or adhering with glue, etc., so as to be in optical communication with portion 41 and receive generated images from image generator 20. In this embodiment, screen 25 is formed directly on the surface of optical waveguide 22 and a magnifying lens 26 is fixedly positioned thereover to provide additional magnification if desired.

Figure 3:
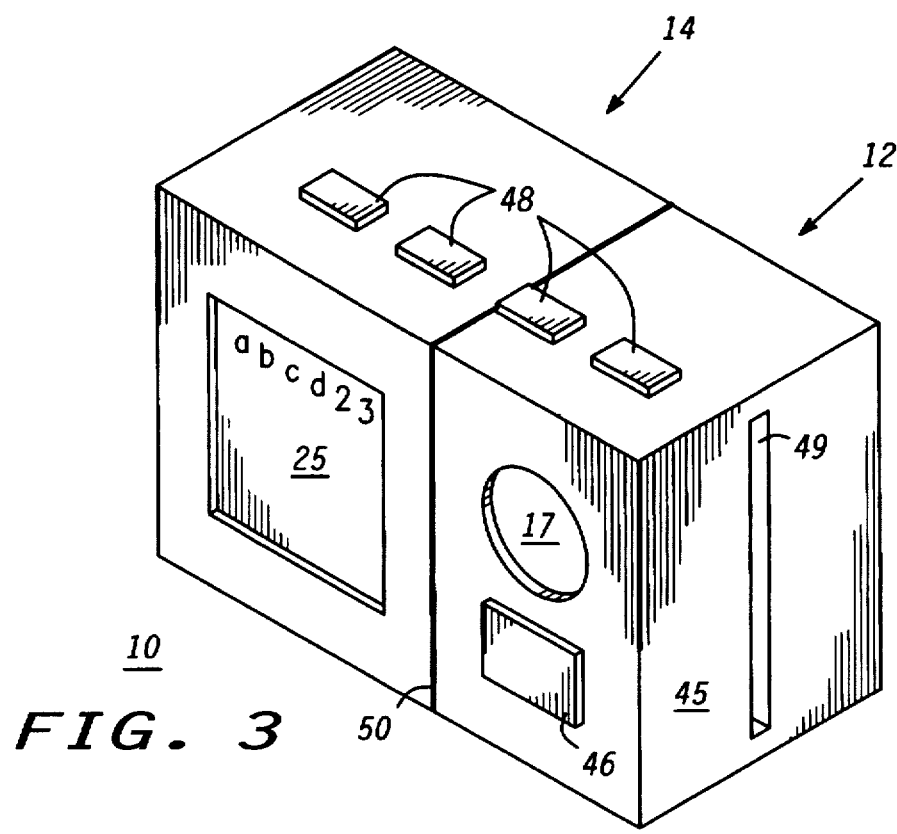
FIG. 3 is a perspective view of the dual image manifestation apparatus with an integrated electro-optical package of FIG. 1.

Referring specifically to FIG. 3, a perspective view of dual image manifestation apparatus 10 in an integrated electro-optical package is illustrated in a typical housing 45. Screen 25 is visible through an opening in the front of housing 45 for the direct viewing of images thereon. Also, an aperture is provided in the front of housing 45 to receive lens system 17 so that the virtual image produced by image manifestation apparatus 12 may be readily viewed. A touch pad 46 is optionally provided on the front surface of housing 45 for controlling a cursor in the virtual image, which cursor may further control displayed keyboards and/or other controls. Additional controls 48 are provided on an upper surface of housing 45 and generally include such features as an on/off switch, and controls for any electronic devices connected thereto.

In this specific embodiment a floppy disk reader is incorporated into housing 45 and a slot 49 is provided in a side of housing 45 for receiving floppy disks therein. Video from the floppy disk is then communicated to either or both image manifestation apparatus 12 and 14 for convenient viewing by the operator. Generally, for example, control signals titles, etc. may appear in the direct view image on screen 25 while larger alpha-numeric messages and graphics will appear in the virtual image at lens system 17. Also, in some applications, it is envisioned that dual image manifestation apparatus 10 may be constructed so that image manifestation apparatus 12 can be physically separated from image manifestation apparatus 14, along line 50 for example, and each can be used separately. In such an embodiment image manifestation apparatus 12 is a very low power device while image manifestation apparatus 14 requires more power and can be, for example, fixedly attached to portable electronic equipment (e.g. a communication receiver).

Figure 4:
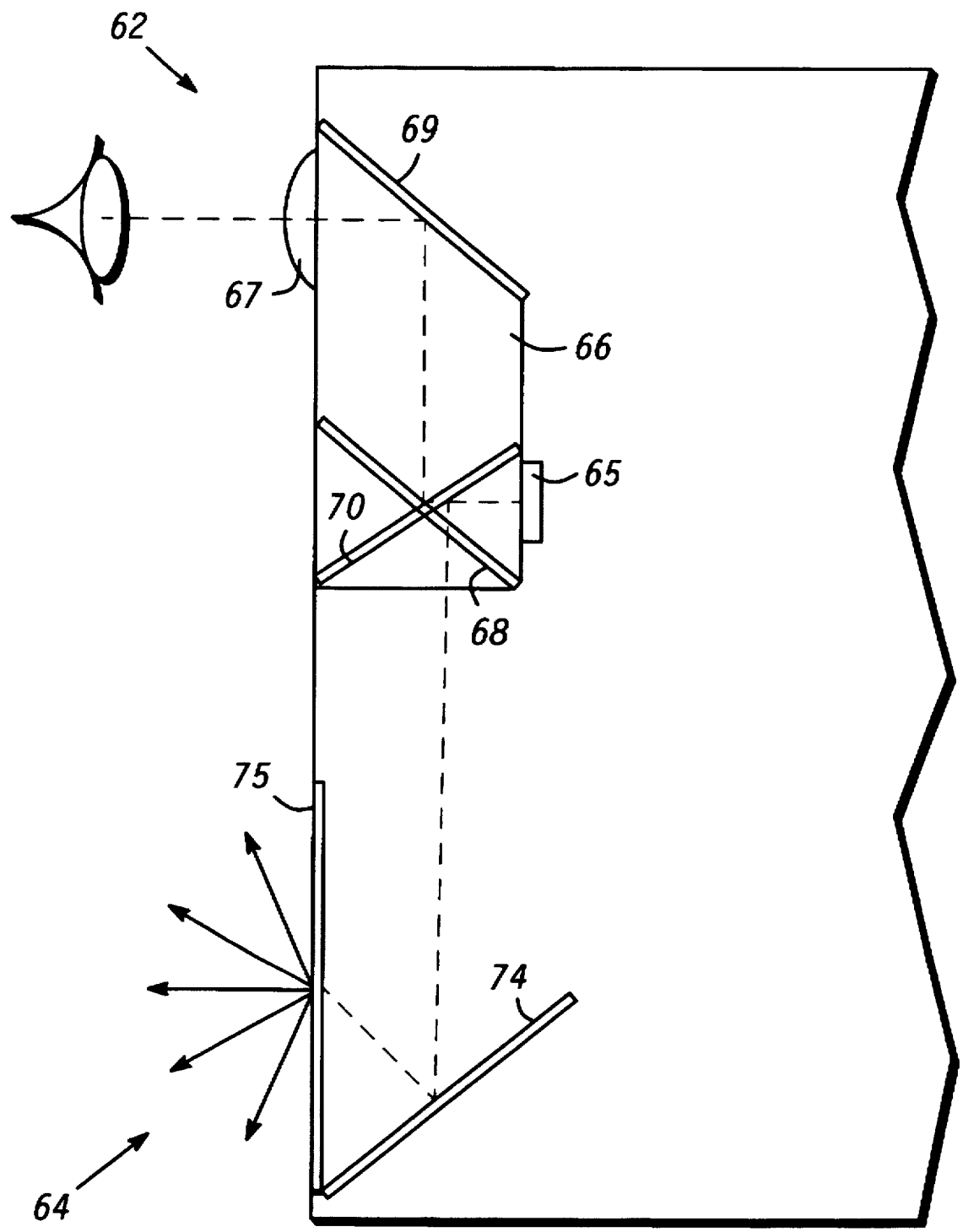
FIG. 4 is a simplified schematic view generally illustrating a different embodiment of dual image manifestation apparatus in accordance with the present invention.

Referring specifically to FIG. 4, a simplified schematic view generally illustrating a different embodiment of dual image manifestation apparatus, constructed in accordance with the present invention and designated 60, is illustrated. Dual image manifestation apparatus 60 includes first image manifestation apparatus 62 constructed to provide a large virtual image and second image manifestation apparatus 64 constructed to provide a direct view image. Apparatus 62 includes a real image generator 65 affixed in overlying relationship to an optical input of an optical waveguide 66. Generally, real image generator 65 is similar to real image generator 15, explained above, and will not be further explained at this point. An optical output of optical waveguide 66 is positioned to be externally available and has a lens system, represented by a single lens 67, affixed thereover.

As explained in conjunction with the embodiment of FIG. 1, optical waveguide 66 includes one or more optical elements 68 and 69, which may be Fresnel lenses, reflective elements, refractive elements, diffractive elements, etc. Elements 68 and 69 provide some magnification and may reduce various types of distortion. Lens system 67 is mounted so as to receive the image from optical waveguide 66, magnify it an additional predetermined amount and create the aperture within which a virtual image is viewed. In the present embodiment, optical waveguide 66 and lens system 67 magnify the image a total of approximately twenty times. Generally, a magnification greater than ten (10×) is required to magnify the real image generated by image generator 65 sufficiently to be perceived by a human eye.

Second image manifestation apparatus 64, constructed to provide a direct view image, receives an image from image generator 65, instead of utilizing a separate image generator as in the previous embodiment. To provide this function, optical waveguide 66 includes an optical element 70 which directs the image from image generator 65 onto an optical element 74 and a direct view screen 75. In this embodiment optical elements 68 and 70 are illustrated as simple reflecting surfaces (e.g. half-mirrors) which direct the image in both directions simultaneously. It will of course be understood that a single mechanically switchable mirror surface could be utilized, a separate prism with reflecting surfaces could be utilized, etc. Also, while element 74 is illustrated as a separate element, it will be understood that it could be incorporated as a portion of the separate switchable mirror or as a portion of optical waveguide 66. Optical element 74 can also include a Fresnel lens, or the like, for focusing and/or magnification if desired. The image from optical element 74 is directed onto screen 75 where it can be directly viewed by the operator.

Image manifestation apparatus 64 provides a direct view image which can be no larger than screen 75 upon which it is projected. Because of the much smaller size of the direct view image, the amount of magnification required is much smaller, i.e. less than approximately 10×. Generally, while the direct view image is much smaller than the virtual image produced by image manifestation apparatus 62, more power is required to generate the direct view image because more light is required to project the image onto screen 75. However, because the direct view image is smaller, any message contained in the direct view image must be larger in order to be perceived by the operator. Thus, whereas one LED in the array of image generator 65 produces one pixel in the final virtual image (for example), several LEDs in the array of image generator 65 may operate in conjunction to produce one pixel in the direct view image on screen 75. This feature can be incorporated into the drive electronics and could be automatically switched or energized when the operator switches from a direct view mode to a virtual image mode of operation. Because several LEDs produce one pixel, in many instances the higher power requirement may be automatically resolved. If additional power is required in some applications, drive current to the LED array can also be automatically increased in the direct view mode.

Figure 5:
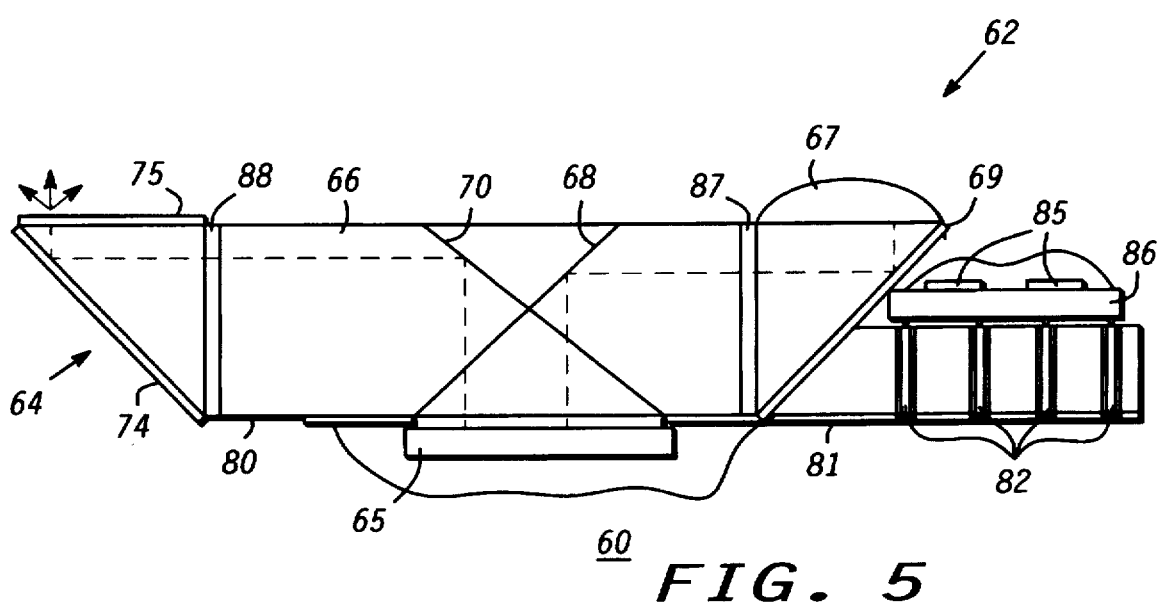
FIG. 5 is a sectional view of the dual image manifestation apparatus with an integrated electro-optical package of FIG. 4.
Figure 6:
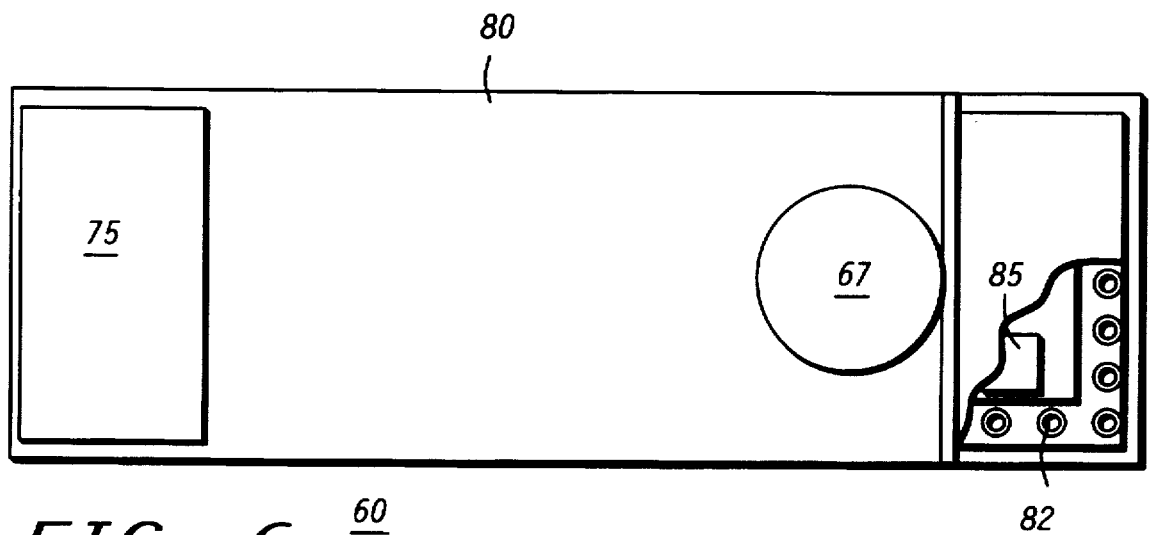
FIG. 6 is a view in front plan of the dual image manifestation apparatus with an integrated electro-optical package of FIG. 4.

Referring specifically to FIG. 5, a sectional view of dual image manifestation apparatus 60 with an integrated electro-optical package is illustrated. Also, FIG. 6 illustrates a view in top plan of the dual image manifestation apparatus of FIG. 5. Components in FIGS. 5 and 6 which are similar to components discussed in conjunction with FIG. 4 are designated with similar numbers. In this embodiment, a mounting structure 80 is provided with leads 81 affixed to, or embedded in, the lower surface. Generally, mounting structure 80 is molded of plastic or the like and leads 81 are flexible leadframes imbedded therein during the molding operation or affixed to the lower surface thereof by a convenient adhesive or the like.

It should be understood that at least a portion of mounting structure 80 (e.g. the left two thirds) is formed of optically clear plastic and the remaining portion can be formed of a convenient material, such as FR4 printed circuit board which is integrated (physically and electrically) with the optical portion during the molding process. Mounting structure 80 has a plurality of feedthrough vias 82 formed therethrough in connection with leads 81 on the lower surface.

Image generator 65 is connected by some convenient means, such as bump bonding, to a lower surface of mounting structure 80 in overlying relationship to the optically clear portion and in electrical contact with leads 81. Image generator 65 is oriented so that images generated thereby are directed upwardly into the optically clear portion of mounting structure 80 toward the top side thereof. Half-mirrors 68 and 70 (which are still illustrated schematically for purposes of this explanation) direct the images in opposite directions within the optically clear portion toward lens system 67 and screen 75, respectively. In this embodiment the optically clear portion is formed into a single optical waveguide 66 for convenience. Also, additional optical elements 87 and 88 (e.g. lenses for focusing or magnifying) can be incorporated, if desired.

A plurality of driver circuits 85 are mounted on a support structure 86 by any convenient means, such as bump bonding, wire bonding, etc. Support structure 86 is then mounted on the upper surface of mounting structure 80, in this embodiment by bump bonding, so that driver circuits 85 are electrically connected to image generator 65 and to external input/output terminals. Various inputs (data, power, etc.) are also provided at various points on the lower surface of mounting structure 80 and connect to the remainder of the circuitry through leads 81. Image generator 65 and driver circuits 85 are encapsulated in any well known manner for protection.

Figure 7:
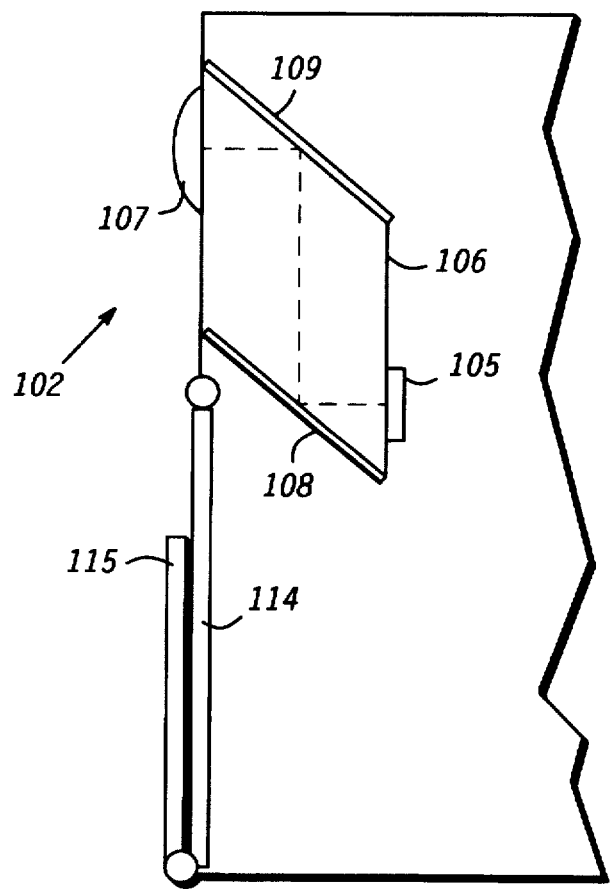
FIG. 7 is a simplified schematic view generally illustrating another embodiment of dual image manifestation apparatus in accordance with the present invention, movable portions thereof being in a first position.
Figure 8:
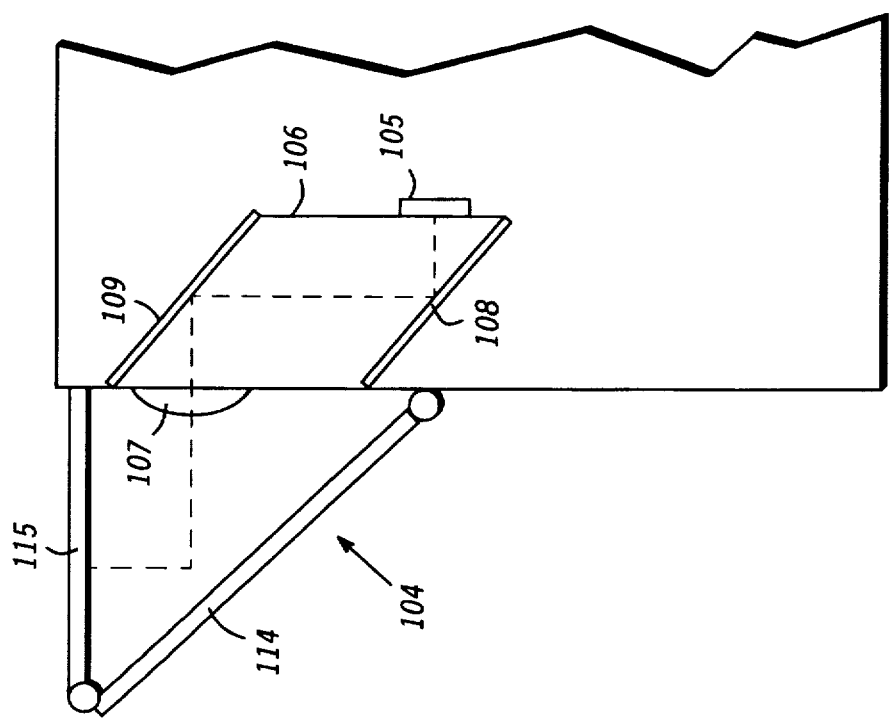
FIG. 8 is a simplified schematic view similar to FIG. 7, with the movable portions thereof being in a second position.

Referring specifically to FIGS. 7 and 8, simplified schematic views generally illustrating a different embodiment of dual image manifestation apparatus, constructed in accordance with the present invention and designated 100, are illustrated. Dual image manifestation apparatus 100 includes first image manifestation apparatus 102 constructed to provide a large virtual image, illustrated in FIG. 7, and second image manifestation apparatus 104 constructed to provide a direct view image, and illustrated in FIG. 8. While separate image manifestation apparatus 102 and 104 are referred to herein for purposes of this explanation, it will be understood by those skilled in the art that apparatus 100 essentially has two modes of operation, which may be designated 102 and 104. Apparatus 102 includes a real image generator 105 affixed in overlying relationship to an optical input of an optical waveguide 106. Generally, real image generator 105 is similar to real image generator 15, explained above, and will not be further explained at this point. An optical output of optical waveguide 106 is positioned to be externally available and has a lens system, represented by a single lens 107, affixed thereover.

As explained in conjunction with the embodiment of FIG. 1, optical waveguide 106 includes one or more optical elements 108 and 109, which may be Fresnel lenses, reflective elements, refractive elements, diffractive elements, etc. Elements 108 and 109 provide some magnification and may reduce various types of distortion. Lens system 107 is mounted so as to receive the image from optical waveguide 106, magnify it an additional predetermined amount and create the aperture within which a virtual image is viewed. In the present embodiment, optical waveguide 106 and lens system 107 magnify the image a total of approximately twenty times. Generally, a magnification greater than ten (10×) is required to magnify the real image generated by image generator 105 sufficiently to be perceived by a human eye.

Second image manifestation apparatus 104 (FIG. 8), constructed to provide a direct view image, incorporates a reflective optical element 114 and a screen 115 pivotally attached to a surface of dual image manifestation apparatus 100. Reflective optical element 114 and screen 115 are positioned so that images from lens system 107 are focused on screen 115 (rather than receiving a virtual image). Thus, reflective optical element 114 and screen 115, when pivoted into the mode illustrated in FIG. 8, essentially convert virtual image manifestation apparatus 102 into direct view image manifestation apparatus 104. Optical element 114 can also include a Fresnel lens, or the like, for focusing and/or magnification if desired.

Image manifestation apparatus 104 provides a direct view image which can be no larger than screen 115 upon which it is projected. Because of the much smaller size of the direct view image, the amount of magnification required is much smaller, i.e. less than approximately 10×. This smaller magnification is achieved by positioning reflective optical element 114 and screen 115 at a focal point of lens system 107. Generally, while the direct view image is much smaller than the virtual image produced by image manifestation apparatus 102, more power is required to generate the direct view image because more light is required to project the image onto screen 115. However, because the direct view image on screen 115 is smaller, any message contained in the direct view image must be larger in order to be perceived by the operator. Thus, whereas one LED in the array of image generator 105 produces one pixel in the final virtual image (for example), several LEDs in the array of image generator 105 may operate in conjunction to produce one pixel in the direct view image on screen 115. This feature can be incorporated into the drive electronics and could be automatically switched or energized when the operator pivots element 114 and screen 115 from a virtual image mode to a direct view mode of operation. Because several LEDs produce one pixel, in many instances the higher power requirement may be automatically resolved. If additional power is required in some applications, drive current to the LED array can also be automatically increased in the direct view mode.

Figure 11:
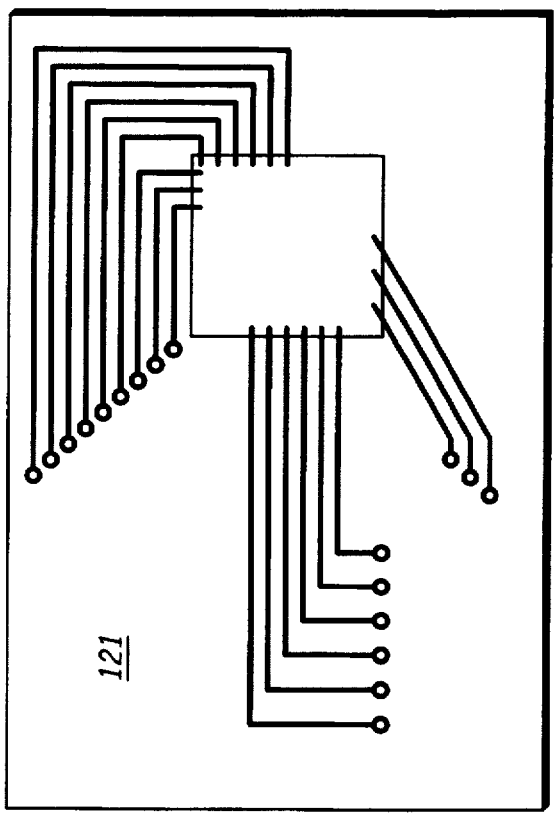
FIG. 11 is a view in top plan of a portion of the dual image manifestation apparatus with an integrated electro-optical package of FIG. 10.
Figure 9:
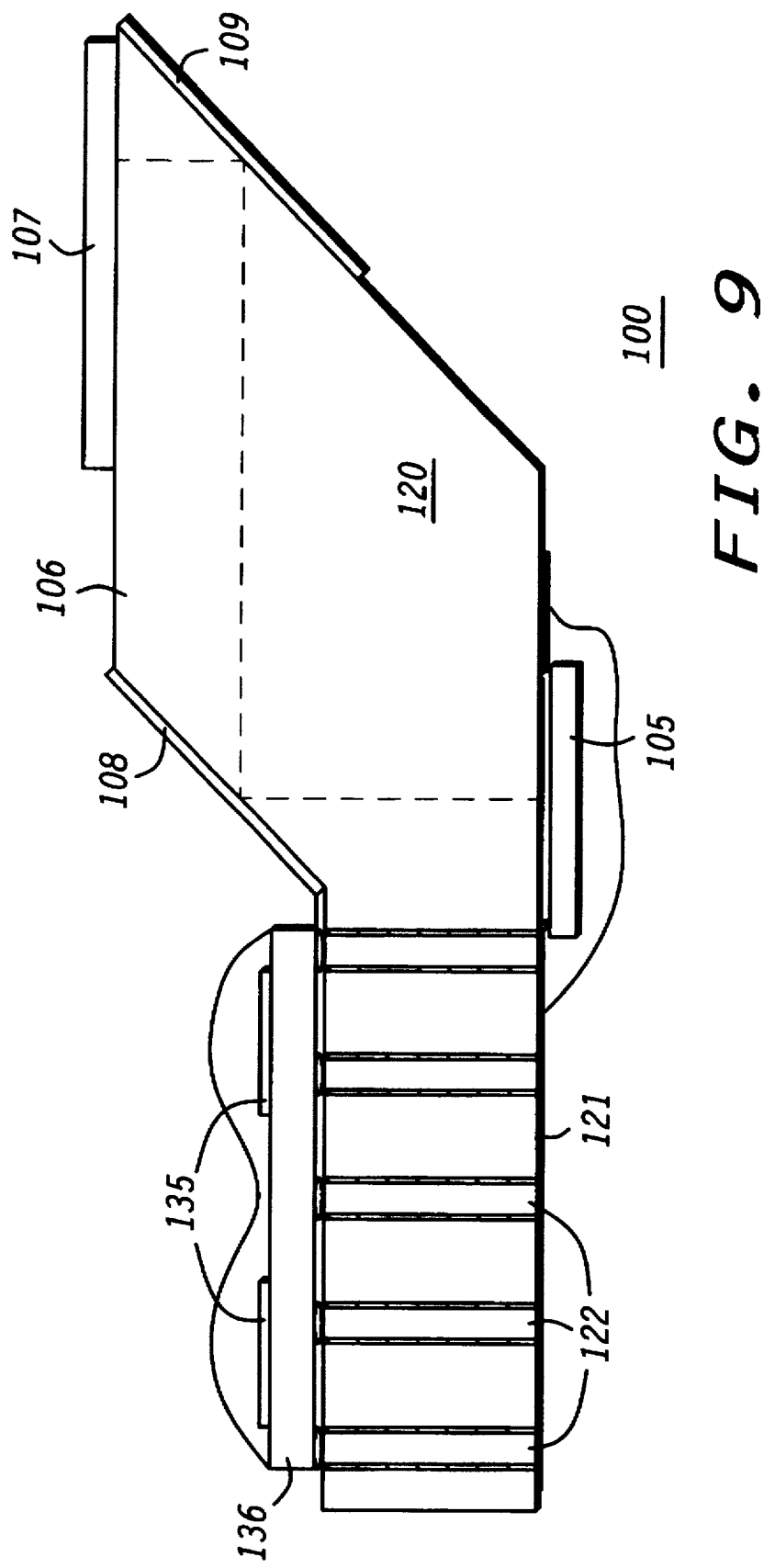
FIG. 9 is a sectional view of the dual image manifestation apparatus with an integrated electro-optical package of FIG. 7.
Figure 10:
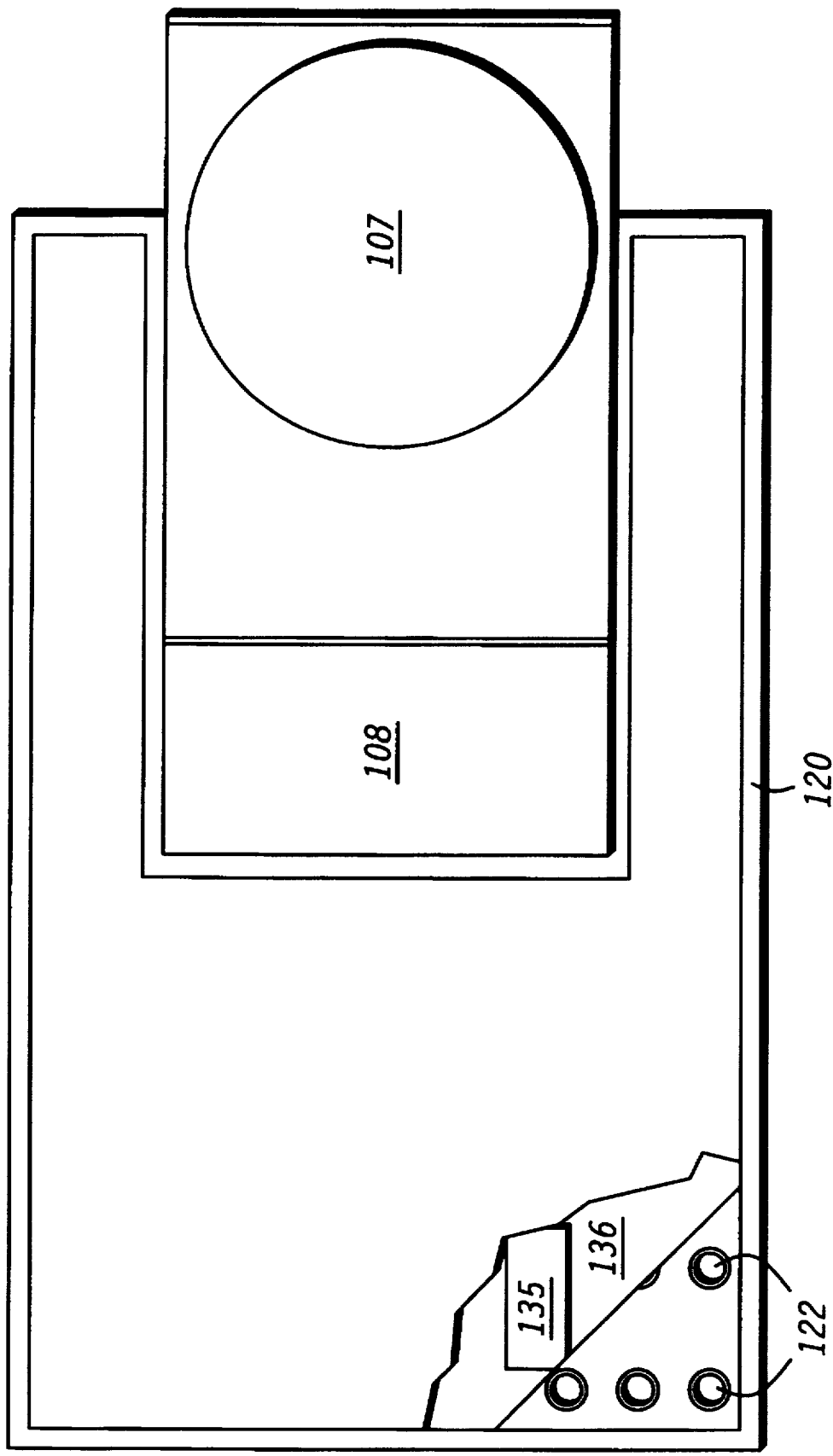
FIG. 10 is a view in top plan of the dual image manifestation apparatus with an integrated electro-optical package of FIG. 7.

Referring specifically to FIG. 9, a sectional view of dual image manifestation apparatus 100 with an integrated electro-optical package is illustrated. Also, FIG. 10 illustrates a view in top plan of the dual image manifestation apparatus of FIG. 9. Components in FIGS. 9 and 10 which are similar to components discussed in conjunction with FIGS. 7 and 8 are designated with similar numbers. In this embodiment, a mounting structure 120 is provided with leads 121 affixed to, or embedded in, the lower surface. Generally, mounting structure 120 is molded of plastic or the like and leads 121 are flexible leadframes (see for example FIG. 11) embedded therein during the molding operation or affixed to the lower surface thereof by a convenient adhesive or the like.

It should be understood that at least a portion of mounting structure 120 (e.g. the right one half) is formed of optically clear plastic and the remaining portion can be formed of a convenient material, such as FR4 printed circuit board which is integrated (physically and electrically) with the optical portion during the molding process. Mounting structure 120 has a plurality of feedthrough vias 122 formed therethrough in connection with leads 121 on the lower surface.

Image generator 105 is connected by some convenient means, such as bump bonding, to a lower surface of mounting structure 120 in overlying relationship to the optically clear portion and in electrical contact with leads 121. Image generator 105 is oriented so that images generated thereby are directed upwardly into the optically clear portion of mounting structure 120 toward the top side thereof. Optical elements 108 and 109 direct the images within the optically clear portion toward lens system 107. In this embodiment the optically clear portion is formed into a single optical waveguide 106 for convenience.

A plurality of driver circuits 135 are mounted on a support structure 136 by any convenient means, such as bump bonding, wire bonding, etc. Support structure 136 is then mounted on the upper surface of mounting structure 120, in this embodiment by bump bonding, so that driver circuits 135 are electrically connected to image generator 105 and to external input/output terminals. Various inputs (data, power, etc.) are also provided at various points on the lower surface of mounting structure 120 and connect to the remainder of the circuitry through leads 121. Image generator 105 and driver circuits 135 are encapsulated in any well known manner for protection.

Accordingly, several embodiments of new and improved dual image manifestation apparatus with an integrated electro-optic package have been disclosed. Each embodiment of the new and improved dual image manifestation apparatus with an integrated electro-optic package includes a direct view display and a large virtual display. The dual display provides a much greater utility for various portable electronic devices, such as communication transceivers and the like. Also, each new and improved dual image manifestation apparatus is compactly, easily and inexpensively fabricated in the disclosed integrated electro-optic package which can be easily incorporated into portable electronic equipment.

While we have shown and described specific embodiments of the present invention, further modifications and improvements will occur to those skilled in the art. We desire it to be understood, therefore, that this invention is not limited to the particular forms shown and we intend in the appended claims to cover all modifications that do not depart from the spirit and scope of this invention.

What is claimed is:

1. Dual image manifestation apparatus with an integrated electro-optical package comprising:

a mounting structure;

real image generation means mounted on the mounting structure for providing at least one real image;

a low magnification optical system supported on the mounting structure to receive the one real image at a low magnification optical input and provide a magnified real image directly viewable at a low magnification optical output; and a high magnification optical system supported on the mounting structure to receive the one real image at a high magnification optical input and provide an enlarged virtual image at a high magnification optical output.

2. Dual image manifestation apparatus with an integrated electro-optical package as claimed in claim 1 wherein the low magnification optical system magnifies received real images less than approximately 10× and the high magnification optical system magnifies received real images more than approximately 10×.

3. Dual image manifestation apparatus with an integrated electro-optical package as claimed in claim 1 wherein the mounting structure includes optically clear plastic material molded into a desired shape.

4. Dual image manifestation apparatus with an integrated electro-optical package as claimed in claim 1 wherein the real image generation means includes an image generator with a substrate mounted on the mounting structure, the image generator further including a two dimensional array of light emitting devices formed on the substrate and cooperating to generate a complete real image, the light emitting devices being positioned in rows and columns to define all pixels of the real image and operably connected to connection/mounting pads adjacent outer edges of the substrate.

5. Dual image manifestation apparatus with an integrated electro-optical package as claimed in claim 4 wherein the real image generation means further includes a plurality of driver circuits having terminals and connected to the light emitting devices through the terminals and the connection/mounting pads on outer edges of the substrate.

6. Dual image manifestation apparatus with an integrated electro-optical package as claimed in claim 5 wherein the plurality of driver circuits include at least one integrated circuit mounted on a support structure and the terminals are formed in the support structure and electrically connected to the integrated circuit through leads formed in the support structure.

7. Dual image manifestation apparatus with an integrated electro-optical package as claimed in claim 6 wherein the support structure includes a printed circuit board.

8. Dual image manifestation apparatus with an integrated electro-optical package as claimed in claim 7 wherein the printed circuit board of the support structure is formed of FR4 material.

9. Dual image manifestation apparatus with an integrated electro-optical package as claimed in claim 6 wherein the mounting structure includes plastic material molded into an optical portion and an electrical portion with at least the optical portion being formed of optically clear plastic.

10. Dual image manifestation apparatus with an integrated electro-optical package as claimed in claim 9 wherein the electrical portion of the mounting structure includes a plurality of mounting terminals having the terminals of the driver circuit support structure physically and electrically attached to a first group of the plurality of mounting terminals.

11. Dual image manifestation apparatus with an integrated electro-optical package as claimed in claim 10 wherein the electrical portion of the mounting structure further includes leads extending from a second group of the plurality of mounting terminals to the first group of the plurality of mounting terminals, the second group of the plurality of mounting terminals being positioned adjacent the optical portion of the mounting structure and having the connection/mounting pads of the substrate of the image generator physically and electrically attached thereto.

12. Dual image manifestation apparatus with an integrated electro-optical package as claimed in claim 9 wherein the optical portion includes an optical waveguide having an optical waveguide input and at least one optical waveguide output, with the optical waveguide being positioned to receive the real image from the image generation means at the optical waveguide input and direct the real image to the optical waveguide output.

13. Dual image manifestation apparatus with an integrated electro-optical package as claimed in claim 12 wherein the optical waveguide includes optical elements positioned to receive the image and provide magnification.

14. Dual image manifestation apparatus with an integrated electro-optical package as claimed in claim 13 wherein the optical elements include reflective surfaces.

15. Dual image manifestation apparatus with an integrated electro-optical package as claimed in claim 13 wherein the optical elements include a diffractive lens.

16. Dual image manifestation apparatus with an integrated electro-optical package as claimed in claim 13 wherein the optical waveguide includes two optical waveguide outputs and an optical element positioned to direct the image received at the optical waveguide input to one of the two optical waveguide outputs.

17. Dual image manifestation apparatus with an integrated electro-optical package as claimed in claim 1 including in addition a communications device connected to the real image generation means for supplying video signals to the real image generation means.

18. Dual image manifestation apparatus with an integrated electro-optical package as claimed in claim 17 wherein the communications device includes one of a pager, a two-way radio, and a cellular telephone.

19. Dual image manifestation apparatus with an integrated electro-optical package as claimed in claim 1 wherein the real image generation means includes a pair of image generators mounted on the mounting structure, each of the pair of image generators including a two dimensional array of light emitting devices formed on a substrate and cooperating to generate a pair of separate and complete real images, the light emitting devices being operably connected to connection/mounting pads adjacent outer edges of the substrate of each of the pair of image generators.

20. Dual image manifestation apparatus with an integrated electro-optical package as claimed in claim 1 wherein the real image generation means includes an image generator mounted on the mounting structure with a two dimensional array of light emitting devices formed thereon and cooperating to generate a complete real image, the light emitting devices being positioned in rows and columns to define all pixels of the real image and operably connected to connection/mounting pads adjacent outer edges of the mounting structure, and the real image generation means further includes optics with a single optics input and first and second optics outputs, the optics are supported on the mounting structure so that the one real image from the image generator is in communication with the single optics input, the first optics output is in communication with the low magnification optical input of the low magnification optical system, and the second optics output is in communication with the high magnification optical input of the high magnification optical system.

21. Dual image manifestation apparatus with an integrated electro-optical package as claimed in claim 1 wherein the high magnification optical system is movable between an operative and an inoperative position, the high magnification optical system being supported on the mounting structure to receive the one real image from the low magnification system in the operative position and provide an enlarged virtual image at the high magnification optical output.

22. Dual image manifestation apparatus with an integrated electro-optical package comprising:

a mounting structure;

real image generation means mounted on the mounting structure for providing first and second real images;

a low magnification optical system supported on the mounting structure to receive the first real image at a low magnification optical input and provide a real image directly viewable at a low magnification optical output; and a high magnification optical system supported on the mounting structure to receive the second real image at a high magnification optical input and provide an enlarged virtual image at a high magnification optical output.

23. Dual image manifestation apparatus with an integrated electro-optical package as claimed in claim 22 wherein the real image generation means includes an image generator mounted on the mounting structure with a two dimensional array of light emitting devices formed thereon and cooperating to generate a complete real image, the light emitting devices being positioned in rows and columns to define all pixels of the real image and operably connected to connection/mounting pads adjacent outer edges of the mounting structure.

24. Dual image manifestation apparatus with an integrated electro-optical package as claimed in claim 23 wherein the real image generation means includes an optical waveguide affixed to the mounting structure and having an optical waveguide input and first and second optical waveguide outputs, with the optical waveguide being positioned to receive the real image from the image generation means at the optical waveguide input and direct the real image to the first and second optical waveguide outputs.

25. Dual image manifestation apparatus with an integrated electro-optical package as claimed in claim 24 wherein the optical waveguide includes optical elements positioned to receive the real image and provide magnification.

26. Dual image manifestation apparatus with an integrated electro-optical package as claimed in claim 25 wherein the optical elements include reflective surfaces.

27. Dual image manifestation apparatus with an integrated electro-optical package as claimed in claim 25 wherein the optical elements include a diffractive lens.

28. Dual image manifestation apparatus with an integrated electro-optical package as claimed in claim 24 wherein the optical waveguide includes an optical element positioned to direct the image received at the optical waveguide input to one of the first and second optical waveguide outputs.

29. Dual image manifestation apparatus with an integrated electro-optical package comprising:

a mounting structure having a plurality of terminals and mounting pads;

direct view image manifestation apparatus including
a first image generator mounted on the mounting structure with a two dimensional array of light emitting devices formed thereon and cooperating to generate a complete real image, the light emitting devices being positioned in rows and columns to define all pixels of the real image and operably connected to connection/mounting pads adjacent outer edges of the first image generator, the connection/mounting pads being physically and electrically attached to the terminals and mounting pads of the mounting structure,
a first plurality of driver circuits mounted on the mounting structure and connected to the light emitting devices of the first image generator through the terminals and mounting pads on the mounting structure, and
a first lens system fixedly mounted relative to the mounting structure and the first image generator to receive and magnify the real image and produce an easily viewable direct view, real image; and virtual image manifestation apparatus including
a second image generator mounted on the mounting structure with a two dimensional array of light emitting devices formed thereon and cooperating to generate a complete real image, the light emitting devices being positioned in rows and columns to define all pixels of the real image and operably connected to connection/mounting pads adjacent outer edges of the second image generator, the connection/mounting pads being physically and electrically attached to the terminals and mounting pads of the mounting structure,
a second plurality of driver circuits mounted on the mounting structure and connected to the light emitting devices of the second image generator through the terminals and mounting pads on the mounting structure, and
a second lens system fixedly mounted relative to the mounting structure and the second image generator to receive and magnify the real image and produce an easily viewable virtual image.

30. Dual image manifestation apparatus with an integrated electro-optical package as claimed in claim 29 wherein the mounting structure includes first and second removeably attached portions with the first image generator, the first plurality of driver circuits and the first lens system being mounted on the first portion and the second image generator, the second plurality of driver circuits and the second lens system being mounted on the second portion.

31. A method of fabricating dual image manifestation apparatus with an integrated electro-optical package comprising the steps of:

providing a mounting structure;

forming real image generation means for providing at least one real image, and mounting the real image generation means on the mounting structure;

supporting a low magnification optical system on the mounting structure so as to receive the one real image at a low magnification optical input and provide a magnified real image directly viewable at a low magnification optical output; and supporting a high magnification optical system on the mounting structure so as to receive the one real image at a high magnification optical input and provide an enlarged virtual image at a high magnification optical output.

32. A method of fabricating dual image manifestation apparatus with an integrated electro-optical package as claimed in claim 31 wherein the step of providing a mounting structure includes molding optically clear plastic material into a desired shape.

33. A method of fabricating dual image manifestation apparatus with an integrated electro-optical package as claimed in claim 32 wherein the step of providing a mounting structure includes molding electrical leads into the mounting structure.

34. A method of fabricating dual image manifestation apparatus with an integrated electro-optical package as claimed in claim 32 wherein the step of providing a mounting structure includes molding optical elements into the mounting structure.

* * * * *